(12) United States Patent
Philipp

(10) Patent No.: US 6,188,228 B1
(45) Date of Patent: Feb. 13, 2001

(54) HAMMER HAVING INTEGRAL STUD AND MAINS SENSOR

(76) Inventor: Harald Philipp, 651 Holiday Dr., Bldg. 5, Suite 300, Pittsburgh, PA (US) 15220

( * ) Notice: Under 35 U.S.C. 154(b), the term of this patent shall be extended for 0 days.

(21) Appl. No.: 09/187,588

(22) Filed: Nov. 6, 1998

(30) Foreign Application Priority Data

Nov. 21, 1997 (GB) .................................... 9724542

(51) Int. Cl.[7] .......................... G01R 27/26; G01R 27/04; G01R 19/00
(52) U.S. Cl. ............................ 324/658; 324/642; 324/67
(58) Field of Search ................................ 324/642, 658, 324/678, 67, 663, 686, 690; 7/143, 146

(56) References Cited

U.S. PATENT DOCUMENTS

| | | | |
|---|---|---|---|
| 4,099,188 | 7/1978 | Franklin et al. | 324/61 R |
| 4,464,622 | 8/1984 | Franklin | 324/67 |
| 4,853,617 | 8/1989 | Douglas et al. | 324/67 |
| 4,992,741 | 2/1991 | Douglas et al. | 324/671 |
| 5,296,806 * | 3/1994 | Hurl, Jr. | 324/642 |
| 5,352,974 | 10/1994 | Heger | 324/67 |
| 5,457,394 * | 10/1995 | McEwan | 324/642 |
| 5,512,834 * | 4/1996 | McEwan | 324/67 |
| 5,562,240 | 10/1996 | Campbell | 227/130 |
| 5,730,165 * | 3/1998 | Philipp | 324/678 |

OTHER PUBLICATIONS

"The QProx Electronic Hammer", Quantum Research Group, Ltd., by H. Philipp. A catalog page published on the internet at http://interquant.com/hammer.htm and printed out on Jul. 6, 1998.

* cited by examiner

*Primary Examiner*—Safet Metjahic
*Assistant Examiner*—Jermele M. Hollington
(74) *Attorney, Agent, or Firm*—David Kiewit

(57) ABSTRACT

A composite tool and instrument is configured as a hammer having a metal striking head electrically coupled to capacitive sensing electronics disposed in a handle of the hammer. The head can thus serve as a sensing plate portion of a capacitive sensor responsive to a change in the effective dielectric constant of a building surface caused by the proximity of a structural member hidden behind that surface. The head can also serve as a sensing electrode portion of a sensor used to sense the proximity of AC power lines hidden behind the surface. In a preferred composite tool, the hammer has a handle made of an electrically insulating polymeric material and has an electrical conductor axially threaded through the handle so as to electrically couple the striking head to sensing electronics located in a cavity at the end of the handle distal from the head.

13 Claims, 2 Drawing Sheets

HAMMER HAVING INTEGRAL STUD AND MAINS SENSOR

BACKGROUND OF THE INVENTION

1. Field of the Invention

The invention provides means for finding a support member hidden behind a building surface and for inserting a nail or similar fastener into the support member. In the preferred embodiment a composite tool for construction and remodeling of houses and other buildings is provided by the combination of a capacitive stud sensor with a carpenter's hammer.

2. Background Information

Many buildings have walls, ceilings or floors constructed so that supporting structural members (e.g., wall studs) are concealed behind a surface (eg., a plasterboard wall panel). It is often desirable to determine the location of the hidden structural members—e.g., when one wishes to drive a nail into wall stud in order to hang a picture or other object on the wall. Many approaches to this problem have been proposed and used. These include tapping on the wall and estimating the stud's location from the quality of the sound, as well as moving a pivotally-mounted permanent magnet along the wall to find the ferromagnetic nails or screws that a previous worker had used to hold up the wallboard.

Of particular interest to the present invention is the prior art of locating a hidden structural member by using a capacitive sensor responsive to a change in the effective dielectric constant of the wall created by the presence of that member. Notable among the prior patent art in this area are:

U.S. Pat. No. 4,099,118, wherein Franklin et al. teach a portable capacitive sensor to be moved along the wall and to visually indicate the proximity of a stud to an operator.

U.S. Pat. No. 4,464,622, wherein Franklin teaches a capacitive stud sensor comprising improved adjustment and calibration means. The disclosure of Franklin is herein incorporated by reference.

U.S. Pat. Nos. 4,853,617, and 4,992,741 wherein Douglas et al. teach an instrument comprising a metal detector and a capacitive sensor, the instrument also having a bar-graph display usable by the operator to more accurately determine the location of a hidden structural member. Douglas et al. also provide circuitry responsive to the AC power line frequency (e.g., 50 or 60 Hz) in order to warn the operator of the proximity of energized and unshielded electrical lines behind the wall. The teachings of Douglas et al. are herein incorporated by reference.

U.S. Pat. No. 5,352,974, wherein Heger teaches an improved capacitive sensor that informs its operator when a wall is too thick or too thin for stud detection and when the operator has (incorrectly) calibrated the instrument by placing it over a stud, rather than over a section of the wall between two adjacent studs.

U.S. Pat. No. 5,562,240, wherein Campbell teaches a tool comprising a nail gun, or the like, having a proximity sensor attached thereto, the composite tool further comprising a visual indicator to inform the operator when a firing end of the nail gun is aligned with a wall stud or other nail-receiving structural element.

Also of interest to the present invention is improved apparatus and method for making capacitive proximity measurements, as taught by the inventor in his U.S. Pat. No. 5,730,165, the disclosure of which is herein incorporated by reference.

BRIEF SUMMARY OF THE INVENTION

A composite tool of the invention comprises a hammer having a metal striking head electrically coupled to sensing electronics disposed in a handle of the hammer. The head can thus serve as a sensing plate portion of a capacitive sensor responsive to a change in the effective dielectric constant of a building surface caused by the proximity of a structural member hidden behind that surface. The head can also serve as a sensing electrode portion of a sensor used to sense the proximity of AC power lines hidden behind the surface. In a preferred embodiment, the hammer has a handle made of electrically insulating polymeric material, the handle having an electrical conductor axially threaded therethrough, the conductor electrically coupling the striking head to sensing electronics disposed within the handle.

The composite tool comprises indicator means displaying the proximity of a structural member, or of energized AC wiring to an operator. In a preferred embodiment, the indicator means comprises a visual bar-graph display capable of displaying an effective wall thickness when the head of the hammer is touched to the wall and moved thereacross. In another embodiment, the indicator means comprises a light emitting diode, or other such light source having a controllable flash rate and operated responsive to the effective wall thickness to signal the proximity of a structural member to an operator. Moreover, in some embodiments the composite tool of the invention may comprise other visual, audible, or tactile signaling means for indicating to an operator that the head of the hammer is adjacent an AC power line hidden behind a wall.

In addition to providing a capacitive proximity instrument for sensing and displaying the effective thickness of a building wall, a preferred embodiment of the invention also comprises a second capacitive sensing means for sensing the proximity of an operator and for activating the first capacitive proximity measurement means responsive thereto. In a preferred embodiment, the proximity instrument is built into a hammer having a metal striking head and an electrically insulating handle.

DETAILED DESCRIPTION OF THE INVENTION

Figure 1:
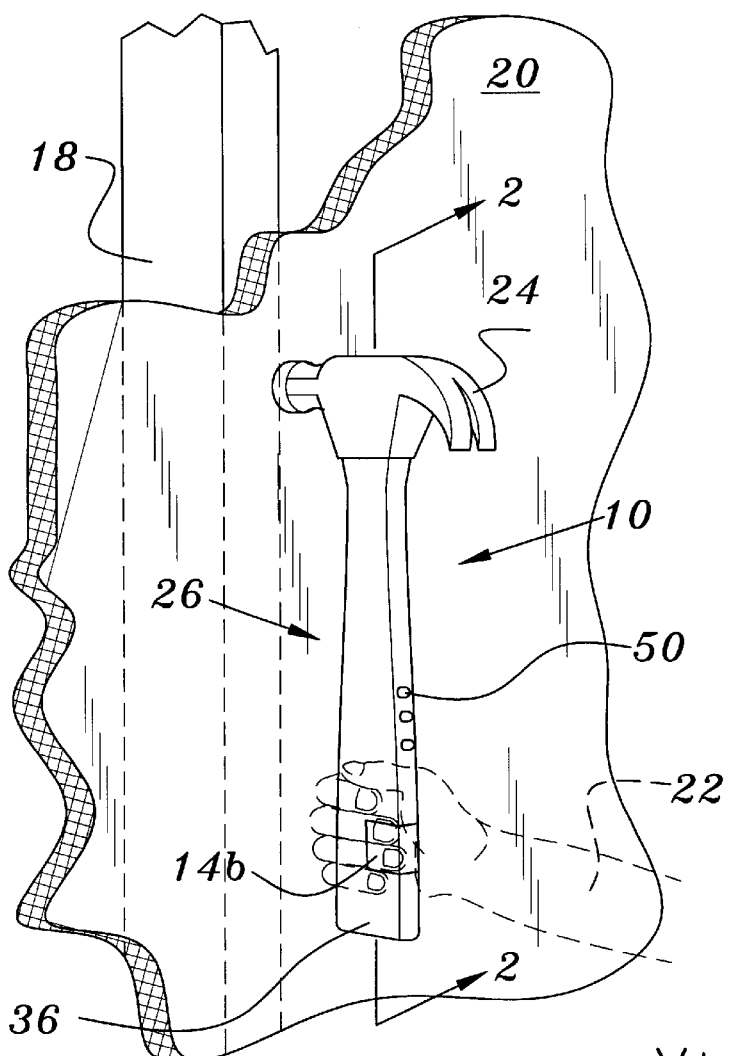
FIG. 1 is a partly cut-away perspective view of a stud-sensing hammer of the invention proximate a hidden stud.

A hammer 10, modified by the inclusion of a capacitive sensing circuit 12 configured to measure an electrical capacitance between a plate 14 and an electric ground 16, can be used to determine the location of objects, such as a wall stud 18, hidden behind a wall 20 or other opaque surface. As hereinbefore noted, a variety of capacitive sensors have been applied to this use, but these have generally required a person 22 seeking the stud 18 to use a sensor separate from the hammer. The present invention simplifies the user's task by using the metal striking head 24 of the hammer 10 as the sensing plate 14.

Figure 2:
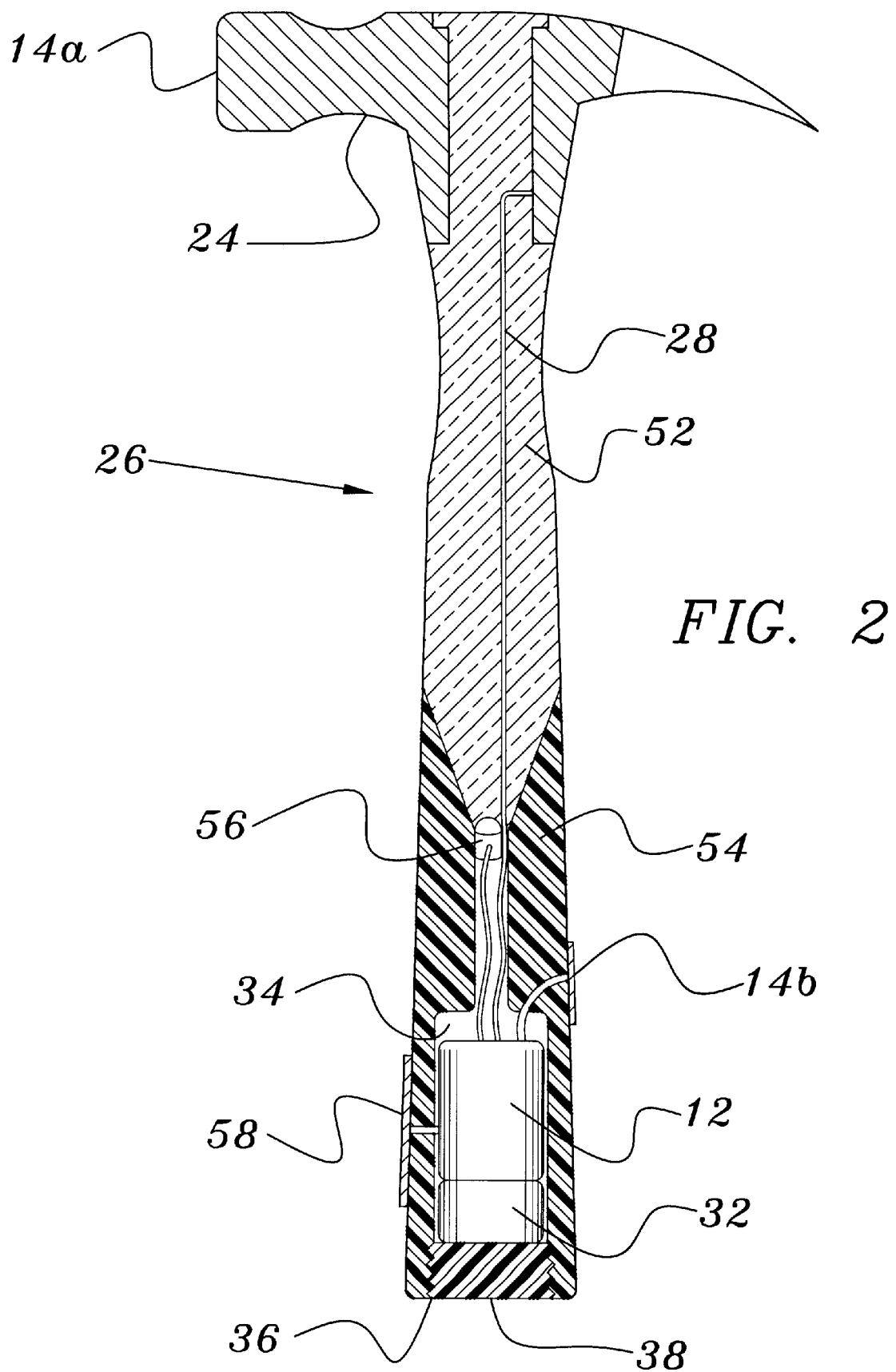
FIG. 2 is a sectional view of a second embodiment of the invention, the section taken as depicted by the double-headed arrow 2—2 in FIG. 1.

In a preferred embodiment the hammer 10 comprises a metal striking head 24 and a dielectric handle portion 26 depending therefrom. A wire 28 or other metallic member, such as a conductor trace on a circuit board, is disposed generally along the axis 30 of the handle 26 and is either metallically connected to or capacitively coupled to the head 24 so as to couple it to the rest of the capacitive sensing circuitry 12, which may be disposed, along with a portable energy supply 32, in a cavity 34 formed in that end 36 of the handle 26 distal from the head 24. As depicted in FIG. 2, a threaded plug 38, or other suitable closure, may be used to seal these elements within the handle 26. Although the preferred source of energy is a lithium primary battery that is expected to power the sensing circuitry 12 for several years, other known portable energy sources could be used. Applicable portable energy sources include a high value capacitor of the type commonly called a "capattery"; a secondary battery rechargeable from the AC power lines; or a secondary battery rechargeable by means of a solar cell.

Figure 3:
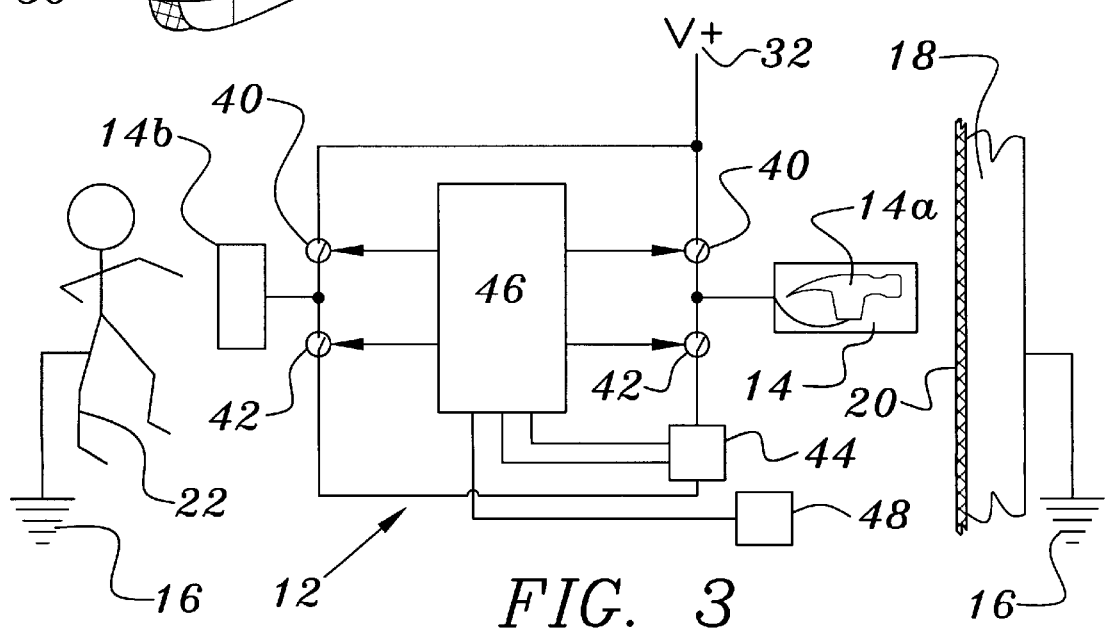
FIG. 3 is schematic circuit diagram showing the sensing electronics of the invention

Although capacitive sensing circuitry of the sort earlier taught by Franklin in U.S. Pat. No. 4,464,622, or by Douglas et al. in U.S. Pat. Nos. 4,853,617, and 4,995,741, could be used in practicing the invention, a preferred embodiment employs capacitive sensing circuitry 12 of the type referred to as charge transfer sensing circuitry. The inventor has provided teaching of this sort of circuitry for other uses in his U.S. Pat. No. 5,730,165. Turning now to FIG. 3, one finds a schematic depiction of a charge transfer measurement circuit 12 comprising a first sensing plate 14a (i.e., the hammer head 24) used to measure a first electrical capacitance to an electrical ground 16. As is known from the inventor's earlier teachings, this is advantageously done by repeatedly charging the plate 14a by means of a charging transistor 40 and subsequently discharging the plate 14a by means of a discharging transistor 42 into a charge detector 44. This process is preferably carried out under the control of a microcontroller 46, which has the capability of selectively measuring either the capacitance of the plate 14a to ground 16 or of measuring the capacitance of a second sensing plate 14b, which may is used to form a "wake-up" area disposed on a portion of the handle 26 distal from the head. When the user places a finger or portion of his or her hand over the wake-up area a preferred sensor makes a transition from a power-conserving sleep mode, in which the wake-up plate is periodically monitored, to a frilly operational mode. It will be realized by those skilled in the art that the wake up plate 14b may comprise a metal plate disposed on the surface of the handle so that the user is coupled thereto upon directly touching the plate, or it may comprise a metal plate disposed beneath a thin insulating layer so that the user is capacitively coupled thereto when placing a portion of his or her body adjacent the plate 14b.

Because the sensor of the invention is a portable device that must operate from an exhaustible power supply 32, in a preferred mode of operation the microcontroller 46 spends much of its time in a well known power-conserving "sleep" mode. At each of a predetermined set of times (e.g., after the expiration of a regular interval) the microcontroller 46 wakes up, measures the capacitance to ground of the wake-up plate 14b and compares the result of that measurement with a predetermined threshold value stored in memory. If a user 22 is holding the hammer 10 so that a portion of his hand rests on the second sensing plate 14b, the capacitance measured at that plate 14b will be above the threshold, and the microcontroller will begin repetitively measuring and displaying the capacitance to ground of the hammer head plate 14a. On the other hand, if the capacitance measured at the TOUCH plate 14b is below the threshold value, the microcontroller 46 returns to sleep mode. In a preferred embodiment the TOUCH plate 14b is disposed on a portion of the surface of the handle 26 that the user does not normally touch while hammering, but that is sufficiently close to his or her normal hand position (e.g., is disposed a few centimeters above where the user's thumb would normally grip the handle) so that a single, comfortable motion is all that is needed for the user to touch the second sensing plate 14b and thereby activate the display. In a less desirable embodiment, the second sensing plate 14b would be disposed on the handle so that the user touched the plate 14b whenever the hammer was being held. In this case, the display would operate during hammering, which could be annoying, but would still provide an energy conserving means by allowing the apparatus to be in sleep mode when not in active use.

When the preferred hammer 10 is being held by a user 22 who is touching the TOUCH sensing plate and the capacitance to ground of the head 24 is being repeatedly measured, the microcontroller 46 provides an output representative of that capacitance to an indicator means 48 adapted to visibly or audibly indicate to the user 22 a current relative value of capacitance. An extremum in this capacitance is associated with the proximate presence of a stud 18 behind the wall 20.

In a preferred embodiment the indicator means 48 may comprise a columnar display 50, which may comprise a plurality of light emitting diodes or a liquid crystal display, is disposed on the back of the hammer handle 26 so that a user 22 can see the measured capacitance represented in a bar-graph fashion on the handle by looking at the columnar display to see the relative height of the active portion. In another embodiment, as depicted in FIG. 2, the hammer handle 26 comprises a transparent or translucent portion 52 proximal the head 24 and an opaque portion 54 distal from the head. In this embodiment the indicator means 48 may comprise a single light emitting diode 56 disposed adjacent the interface between the two portions 52, 54 of the handle, can be turned on and off by the microcontroller 46 at a rate indicative of the measured capacitance. This flashing light will be reflected and refracted at the surface of the handle, so that the operator viewing the handle will see displayed thereon a representation of the measured capacitance. In this embodiment the user 22 moves the hammer head 24 across the wall 20 while observing the rate at which the LED flashes, wherein a maximum in the flash rate may indicate that the hammer head 24 is disposed adjacent a stud 18.

In some known hammers a steel I-beam extends along substantially the entire axis of the hammer handle 26. The I-beam is inserted into the conventional handle-attaching hole in the hammer head 24 and is glued in place in a plastic molding operation that also enrobes the rest of the I-beam with a layer of varying thickness so as to form a handle having a desired shape. It will be understood that the capacitance measurement circuitry, in order to be compatible with this structure, may involve the use of circuit boards that can be fitted about or adjacent the beam and cast into the handle at a selected location along the handle. In one embodiment, the capacitance measurement circuitry is cast into a partially transparent portion of the handle 26 lying between the head and an opaque rubber cushioning grip.

As hereinbefore noted, it is known in the art of electronic stud finding to provide an additional safety feature to the operator by including circuitry responsive to the AC mains frequency and by then warning the operator when the stud finder is disposed adjacent an energized conductor so that he or she does not drive a nail into the wiring. Such means for detecting the presence of energized and unshielded wires may be readily incorporated into the stud sensing hammer of the invention, and suitable alerting means may be provided to warn the operator of a proximate energized conductor. One could, of course, provide a visual warning e.g., by showing a rapidly oscillating bar graph on a columnar display 50 or by using a rapid and repetitive characteristic flashing sequence of an LED 56. Alternately, one could provide a piezoelectric element 58 driven by the sensing circuitry and disposed on a surface of the handle to provide an audible or tactile warning of the hazard.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. Apparatus comprising, in combination, a hammer an a capacitive measurement circuit for sensing an object behind an opaque surface, the apparatus comprising indicator means for indicating the proximity of the sensed object to an operator, the apparatus characterized in that:

a metal striking head of the hammer comprises a sensing plate electrically coupled to the capacitive measurement circuit which is disposed in a handle of the hammer, the capacitive measurement circuit adapted to measure a capacitance between the head of the hammer and an electric ground; and wherein;

the indicator means is adapted to indicate a representation of the measured capacitance.

2. The apparatus of claim 1 wherein the capacitive measurement circuit is adapted to sense the proximity of a wall stud, and wherein the indicator means is adapted to display a bar-graph on the handle of the hammer to indicate the proximity of the stud.

3. The apparatus of claim 1 wherein the capacitive measurement circuit is adapted to sense the proximity of a wall stud, and wherein the indicator means comprises a light source adapted to flash responsive to the proximity of the stud.

4. The apparatus of claim 1 further comprising a second sensing plate disposed on a handle of the hammer distal from the head, the capacitive measurement circuit also adapted to measure a second capacitance between the second sensing plate and the electric ground, wherein the indicator means is adapted to indicate the first measured capacitance only when a portion of an operator's body is coupled to the second plate.

5. The apparatus of claim 1 wherein the head of the hammer is coupled to the capacitive measurement circuit by a metallic conductor running along a longitudinal axis of a handle of the hammer and wherein the capacitive measurement circuit is spaced apart from the head.

6. The apparatus of claim 1 wherein the capacitive measurement circuit comprises a charging transistor for charging the sensing plate, and a discharging transistor for discharging the sensing plate into a charge detector.

7. Apparatus comprising, in combination, a hammer and a capacitive measurement circuit adapted to measure a first electrical capacitance between a metallic head of the hammer and an electrical ground and to indicate the proximate presence of an object hidden behind a wall when an operator grasps the hammer by a handle thereof and moves the head of the hammer across the wall, the apparatus further comprising:

a touch sensing plate disposed on the handle, the capacitive measurement circuit adapted to measure a second electrical capacitance between the touch sensing plate and the ground at each of a plurality of predetermined times and to thereby sense the presence of the operator.

8. The apparatus of claim 7 wherein the touch sensing plate is disposed on a portion of the handle distal from the head.

9. The apparatus of claim 7 wherein the capacitive measurement circuit comprises a charging transistor for charging the head of the hammer, and a discharging transistor for discharging the head of the hammer into a charge detector.

10. The apparatus of claim 7 wherein the capacitive measurement circuit comprises a charging transistor for charging the touch sensing plate, and a discharging transistor for discharging the touch sensing plate into a charge detector.

11. Apparatus for sensing an object behind an opaque building surface and for driving a nail into the sensed object, the apparatus comprising, in combination:

a hammer having a metal striking head for driving the nail; and a capacitive measurement circuit disposed within the hammer, the capacitive measurement circuit adapted to indicate when the striking head is proximate the object.

12. The apparatus of claim 11 wherein the capacitive measurement circuit comprises a charging transistor adapted to charge the striking head and a discharging transistor adapted to discharge the striking head into a charge detector.

13. The apparatus of claim 11 further comprising a touch sensing plate disposed on a handle of the hammer distal from the head, the capacitive measurement circuit further adapted to measure the capacitance between the touch sensing plate and an electric ground and to indicate when the striking head is adjacent the surface and proximate the object only if a portion of an operator's body is adjacent the touch sensing plate.

* * * * *

UNITED STATES PATENT AND TRADEMARK OFFICE
CERTIFICATE OF CORRECTION

PATENT NO. : 6,188,228 B1  
DATED : February 13, 2001  
INVENTOR(S) : Harald Philipp Page 1 of 1

It is certified that error appears in the above-identified patent and that said Letters Patent is hereby corrected as shown below:

Column 5,
Line 17, "an" should read -- and --.

Signed and Sealed this

Thirteenth Day of November, 2001

Attest:

NICHOLAS P. GODICI
Attesting Officer     Acting Director of the United States Patent and Trademark Office